(12) United States Patent
Guo et al.

(10) Patent No.: US 12,022,108 B2
(45) Date of Patent: *Jun. 25, 2024

(54) METHODS AND APPARATUS FOR ADAPTIVE MOTION VECTOR CANDIDATE ORDERING FOR VIDEO ENCODING AND DECODING

(71) Applicant: INTERDIGITAL VC HOLDINGS, INC., Wilmington, DE (US)

(72) Inventors: Liwei Guo, Sunnyvale, CA (US); Peng Yin, Ithaca, NY (US); Yunfei Zheng, San Jose, CA (US); Joel Sole, San Diego, CA (US); Qian Xu, Folsom, CA (US); Xiaoan Lu, Princeton, NJ (US)

(73) Assignee: INTERDIGITAL VC HOLDINGS, INC., Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 17/967,154

(22) Filed: Oct. 17, 2022

(65) Prior Publication Data
US 2023/0040905 A1 Feb. 9, 2023

Related U.S. Application Data

(60) Continuation of application No. 16/904,695, filed on Jun. 18, 2020, now abandoned, which is a
(Continued)

(51) Int. Cl.
*H04N 19/52* (2014.01)
*H04N 19/139* (2014.01)
(Continued)

(52) U.S. Cl.
CPC ........... *H04N 19/52* (2014.11); *H04N 19/139* (2014.11); *H04N 19/44* (2014.11); *H04N 19/567* (2014.11); *H04N 19/70* (2014.11)

(58) Field of Classification Search
CPC ...... H04N 19/139; H04N 19/44; H04N 19/52; H04N 19/567; H04N 19/70
See application file for complete search history.

(56) References Cited

U.S. PATENT DOCUMENTS 6,381,277 B1    4/2002  Chun et al.
8,085,844 B2 *  12/2011 Holcomb ............... H04N 19/70
                                         375/240.23
(Continued)

FOREIGN PATENT DOCUMENTS

CA     3063746       11/2018
CA     3063746 A1 *  11/2018 ........... H04N 19/159
(Continued)

OTHER PUBLICATIONS

Paul et al: Adaptive Search Range Selection for Scalable Video Coding Extension of H.264/AVC, TENCON20008 IEEE Region 10 Conf., Nov. 19-21, 2008, pp. 1-4.—* cited in parent.
(Continued)

*Primary Examiner* — Reza Aghevli
(74) *Attorney, Agent, or Firm* — Ronald Kolczynski

(57) ABSTRACT

Methods and apparatus are provided for adaptive motion vector candidate ordering for video encoding and decoding. An apparatus includes a video encoder (100) for encoding a block in a picture by selecting an order of motion vector predictor candidates for the block responsive to a characteristic available at both the video encoder and a corresponding decoder. The characteristic excludes a mode in which the block is partitioned.

20 Claims, 14 Drawing Sheets

Related U.S. Application Data continuation of application No. 16/006,914, filed on Jun. 13, 2018, now Pat. No. 10,721,490, which is a continuation of application No. 15/295,354, filed on Oct. 17, 2016, now Pat. No. 10,021,412, which is a division of application No. 13/698,468, filed as application No. PCT/US2011/036770 on May 17, 2011, now Pat. No. 9,510,009.

(60) Provisional application No. 61/346,539, filed on May 20, 2010.

(51) Int. Cl.
*H04N 19/44* (2014.01)
*H04N 19/567* (2014.01)
*H04N 19/70* (2014.01)

(56) References Cited

U.S. PATENT DOCUMENTS

| | | | |
|---|---|---|---|
| 8,385,420 B2 | 2/2013 | Lee et al. | |
| 8,537,897 B2 | 9/2013 | Lee et al. | |
| 8,842,729 B2* | 9/2014 | Su | H04N 19/597 |
| | | | 375/240.12 |
| 8,867,621 B2 | 10/2014 | Lee et al. | |
| 9,008,182 B2 | 4/2015 | Tsai et al. | |
| 9,131,239 B2* | 9/2015 | Zheng | H04N 19/52 |
| 9,143,782 B2* | 9/2015 | Yin | H04N 19/46 |
| 9,277,241 B2* | 3/2016 | Chien | H04N 19/60 |
| 9,282,338 B2* | 3/2016 | Zheng | H04N 19/40 |
| 9,288,508 B2* | 3/2016 | Chien | H04N 19/60 |
| 9,300,978 B2* | 3/2016 | Hallapuro | H04N 19/52 |
| 9,313,494 B2* | 4/2016 | Zheng | H04N 19/176 |
| 9,451,287 B2* | 9/2016 | Chien | H04N 19/174 |
| 9,510,009 B2* | 11/2016 | Guo | H04N 19/52 |
| 9,521,429 B2* | 12/2016 | Yin | H04N 19/174 |
| 9,525,888 B2* | 12/2016 | Yin | H04N 19/58 |
| 9,565,447 B2 | 2/2017 | Lee et al. | |
| 10,021,412 B2* | 7/2018 | Guo | H04N 19/70 |
| 10,721,490 B2* | 7/2020 | Guo | H04N 19/567 |
| 2004/0047418 A1* | 3/2004 | Tourapis | H04N 19/19 |
| | | | 375/E7.199 |
| 2004/0114817 A1 | 6/2004 | Jayant et al. | |
| 2004/0264572 A1 | 12/2004 | Sato et al. | |
| 2005/0008240 A1* | 1/2005 | Banerji | H04N 19/895 |
| | | | 375/E7.262 |
| 2005/0013498 A1 | 1/2005 | Srinivasan et al. | |
| 2005/0053137 A1* | 3/2005 | Holcomb | H04N 19/463 |
| | | | 375/E7.138 |
| 2005/0111547 A1* | 5/2005 | Holcomb | H04N 19/112 |
| | | | 375/240.03 |
| 2005/0152452 A1 | 7/2005 | Suzuki | |
| 2006/0083308 A1* | 4/2006 | Schwarz | H04N 19/19 |
| | | | 375/E7.125 |
| 2007/0177674 A1 | 8/2007 | Yang | |
| 2008/0159400 A1* | 7/2008 | Lee | H04N 19/176 |
| | | | 375/E7.157 |
| 2008/0165849 A1 | 7/2008 | Moriya et al. | |
| 2008/0240242 A1 | 10/2008 | Lainema | |
| 2009/0034856 A1 | 2/2009 | Moriya et al. | |
| 2009/0034857 A1 | 2/2009 | Moriya et al. | |
| 2009/0123066 A1 | 5/2009 | Moriya et al. | |
| 2009/0304084 A1* | 12/2009 | Hallapuro | H04N 19/52 |
| | | | 375/E7.123 |
| 2010/0026903 A1 | 2/2010 | Tetsukawa et al. | |
| 2010/0239017 A1 | 9/2010 | Lee et al. | |
| 2011/0013697 A1 | 1/2011 | Choi et al. | |
| 2011/0194609 A1 | 8/2011 | Rusert et al. | |
| 2011/0211640 A1 | 9/2011 | Kim et al. | |
| 2011/0235711 A1 | 9/2011 | Kondo et al. | |
| 2011/0293017 A1* | 12/2011 | Suzuki | H04N 19/51 |
| | | | 375/E7.123 |
| 2012/0027094 A1 | 2/2012 | Sato et al. | |
| 2013/0064301 A1* | 3/2013 | Guo | H04N 19/139 |
| | | | 375/E7.123 |
| 2013/0163668 A1* | 6/2013 | Chen | H04N 19/463 |
| | | | 375/240.14 |
| 2013/0272409 A1* | 10/2013 | Seregin | H04N 19/51 |
| | | | 375/240.16 |
| 2017/0041628 A1 | 2/2017 | Guo et al. | |

FOREIGN PATENT DOCUMENTS

| | | | | |
|---|---|---|---|---|
| CN | 109417629 | | 3/2019 | |
| CN | 109417629 A | * | 3/2019 | ........... H04N 19/105 |
| EP | 1528812 | | 5/2005 | |
| EP | 1528812 A1 | * | 5/2005 | ........... H04N 19/102 |
| KR | 20050111547 | | 11/2005 | |
| KR | 20070053842 | | 5/2007 | |
| WO | WO2008082762 | | 7/2008 | |
| WO | WO2009115901 | | 9/2009 | |
| WO | WO-2009115901 A2 | * | 9/2009 | ........... H04N 19/513 |

OTHER PUBLICATIONS

Kumar etal: "An Efficient Motion Vector Composition Scheme for Arbitrary Frame Down-Sampling Video Transcoder", IEEE, vol. 16, No. 9, Sep. 2006, pp. 1148-1152.—* cited in parent.

Kim etal: "An efficient skip mode competion scheme based on vector clustering and object boundary detection", Electronics EXpress, IEICE 2010, vol. 7, No. 6, pp. 447-453.—* cited in parent.

Huang etal: Analysis and Complexity reduction of Multiple Reference Frames Motion Estimation in H.264/AVC, IEEE, vol. 16, No. 4, Apr. 2006, pp. 507-522.—* cited in parent.

Lee et al: "Block Motion Estimation based on Selective Integral Projections", Image Processing 2002, Int'l Conf., vol. 1, pp. I-689-I692.—* cited in parent.

Liao etal: "Enhanced Fast Mode Decision Based on Edge Map and Motion Detail Analysis For H.264/JVT", 2005 IEEE May 28-30, 2005, pp. 187-190.—* cited in parent.

ITU-T; H.264 (Mar. 2005), "Advanced video coding for generic audiovisual services", Series H: Audiovisual and Multimedia Systems—* cited in parent.

McCann et al: Samsung's Response to the Call for Proposals on Video Compression Technology, JCTVC-A124; Apr. 15-23, 2010.—* cited in parent.

Dai et al., "Motion Vector Coding Based on Optimal Predictor Selection", Advances in Multimedia Information Processing—PCM 2009, Berlin, Heidelberg, Dec. 15, 2009, pp. 1040-1047.—* cited in parent.

Luo et al: Motion Vector Predictor Selection For The Enhancement Layer in the H.264/AVC Extension-Spatial SVC, Picture Coding Symposium, May 6-8, 2009, pp. 1-4.—* cited in parent.

Jakubowski et al: "Multi-Path Adaptive Computation-Aware Search Strategy for Block-Based Motion Estimation", EUROCON Sep. 9-12, 2007 Int'l Conf. on "Computer as a Tool", pp. 175-181.—* cited in parent.

Nisar et al: "Multiple Initial Point Prediction based Block Motion Estimation Algorithm"; Consumer Electronics, Jun. 20-23, 2007, IEEE Int'l Symposium, pp. 1-6.—* cited in parent.

Ates et al: "Rate-Distortion and Complexity Optimized Motion Estimation for H.264 Video Coding", IEEE Transactions on Circuits . . . ; vol. 18, No. 2, Feb. 2008, pp. 159-171.—* cited in parent.

Laroche, et al., "RD Optimized Coding for Motion Vector Predictor Selection", IEEE Transactions on Circuits and Systems, vol. 17, No. 12, Dec. 1, 2008, pp. 168-1691—* cited in parent.

Dai et al., Motion Vector Coding Based on Predictor Selection and Boundary-Matching Estimation, IEEE Multimedia Signal Processing Conference, MMSP '09, Oct. 5-7, 2009, pp. 1-5—* cited in parent.

Kamp et al., Decoder Side Motion Vector Derivation for Inter Frame Video Coding, Image Processing 2008, ICIP 2008, 15th IEEE International Conference, Oct. 12, 2008, pp. 1120-1123.—* cited in parent.

Liu et al., "Adaptive Motion Vector Prediction Based on Spatiotemporal Correlation", 2006 International Conference on Wireless Commu-

(56) References Cited

OTHER PUBLICATIONS nications, Networking and Mobile Computing, (WICOM 2006), Sep. 1, 2006, pp. 1-4.—* cited in parent.

Park et al., CE9 Subtests N and O: Improvement on AMVP, JCT-VC of ITU-T SG16 WP3 and ISO/IEC JTC1/SC29/WG11, 5th Meeting, Geneva, CH, Mar. 16-23, 2011, Document JCTVC-E350—* cited in parent.

Zheng et al., Extended Motion Vector Prediction for Bi Predictive Mode, (JCT-VC) of ITU-T SG16 WP3 and ISO/IEC JTC1/SC29/WG11, 5th Meeting, Geneva, CH, Mar. 16-23, 2011, Document JCTVC-E343—* cited in parent.

Zheng et al., Unified Motion Vector Predictor Selection for Merge and AMVP, JCT-VC of ITU-T SG16 WP3 and ISO/IEC JTC1/SC29/WG11, 5th Meeting, Geneva, CH, Mar. 16-23, 2011, Document JCTVC-E396—* cited in parent.

* cited by examiner

METHODS AND APPARATUS FOR ADAPTIVE MOTION VECTOR CANDIDATE ORDERING FOR VIDEO ENCODING AND DECODING

CROSS-REFERENCE TO RELATED APPLICATIONS

This application is a continuation of U.S. application Ser. No. 13/698,468, filed Nov. 16, 2012 which claims the benefit of International Patent Application PCT/US2011/036770, filed May 17, 2011 and U.S. Provisional Application Ser. No. 61/346,539, filed May 20, 2010, which are incorporated by reference herein in its entirety.

TECHNICAL FIELD

The present principles relate generally to video encoding and decoding and, more particularly, to methods and apparatus for adaptive motion vector candidate ordering for video encoding and decoding.

BACKGROUND

Motion estimation and compensation are widely used in video compression to exploit the temporal redundancy included in a video sequence. Motion information is typically included in motion vectors. A motion vector is the displacement between the current block and its temporal correspondence in the reference frame(s). Such motion information is transmitted, conveyed, and/or otherwise delivered to the decoder as overhead. To reduce the overhead bits used for motion information, various predictive coding approaches are used to encode the motion vector of each block by exploiting the correlations among neighboring motion vectors.

In the current state of the art video coding standard, namely the International Organization for Standardization/International Electrotechnical Commission (ISO/IEC) Moving Picture Experts Group-4 (MPEG-4) Part 10 Advanced Video Coding (AVC) Standard/International Telecommunication Union, Telecommunication Sector (ITU-T) H.264 Recommendation (hereinafter the "MPEG-4 AVC Standard"), a motion vector is predicted by the median of its spatial causal neighboring motion vectors.

In a first prior art approach, the motion vector predictor selection procedure is incorporated into the rate-distortion optimization of a coding block, which is called motion vector competition (MVComp). In MVComp, a coding block has a set of motion vector predictor candidates. This candidate set is composed of motion vectors of spatially or temporally neighboring blocks. The best motion vector predictor will be selected from the candidate set based on the rate-distortion optimization. The index of the motion vector predictor in the set will be explicitly transmitted to the decoder if the set has more than one candidate. However, transmitting this index may disadvantageously consume a lot of bits.

SUMMARY

These and other drawbacks and disadvantages of the prior art are addressed by the present principles, which are directed to methods and apparatus for adaptive motion vector candidate ordering for video encoding and decoding.

According to an aspect of the present principles, there is provided an apparatus. The apparatus includes a video encoder for encoding a block in a picture by selecting an order of motion vector predictor candidates for the block responsive to a characteristic available at both the video encoder and a corresponding decoder. The characteristic excludes a mode in which the block is partitioned.

According to another aspect of the present principles, there is provided a method in a video encoder. The method includes encoding a block in a picture by selecting an order of motion vector predictor candidates for the block responsive to a characteristic available at both the video encoder and a corresponding decoder. The characteristic excludes a mode in which the block is partitioned.

According to still another aspect of the present principles, there is provided an apparatus. The apparatus includes a video decoder for decoding a block in a picture by selecting an order of motion vector predictor candidates for the block responsive to a characteristic available at both the video decoder and a corresponding encoder. The characteristic excludes a mode in which the block is partitioned.

According to a further aspect of the present principles, there is provided a method in a video decoder. The method includes decoding a block in a picture by selecting an order of motion vector predictor candidates for the block responsive to a characteristic available at both the video decoder and a corresponding encoder. The characteristic excludes a mode in which the block is partitioned.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which.

DETAILED DESCRIPTION

Figure 1:
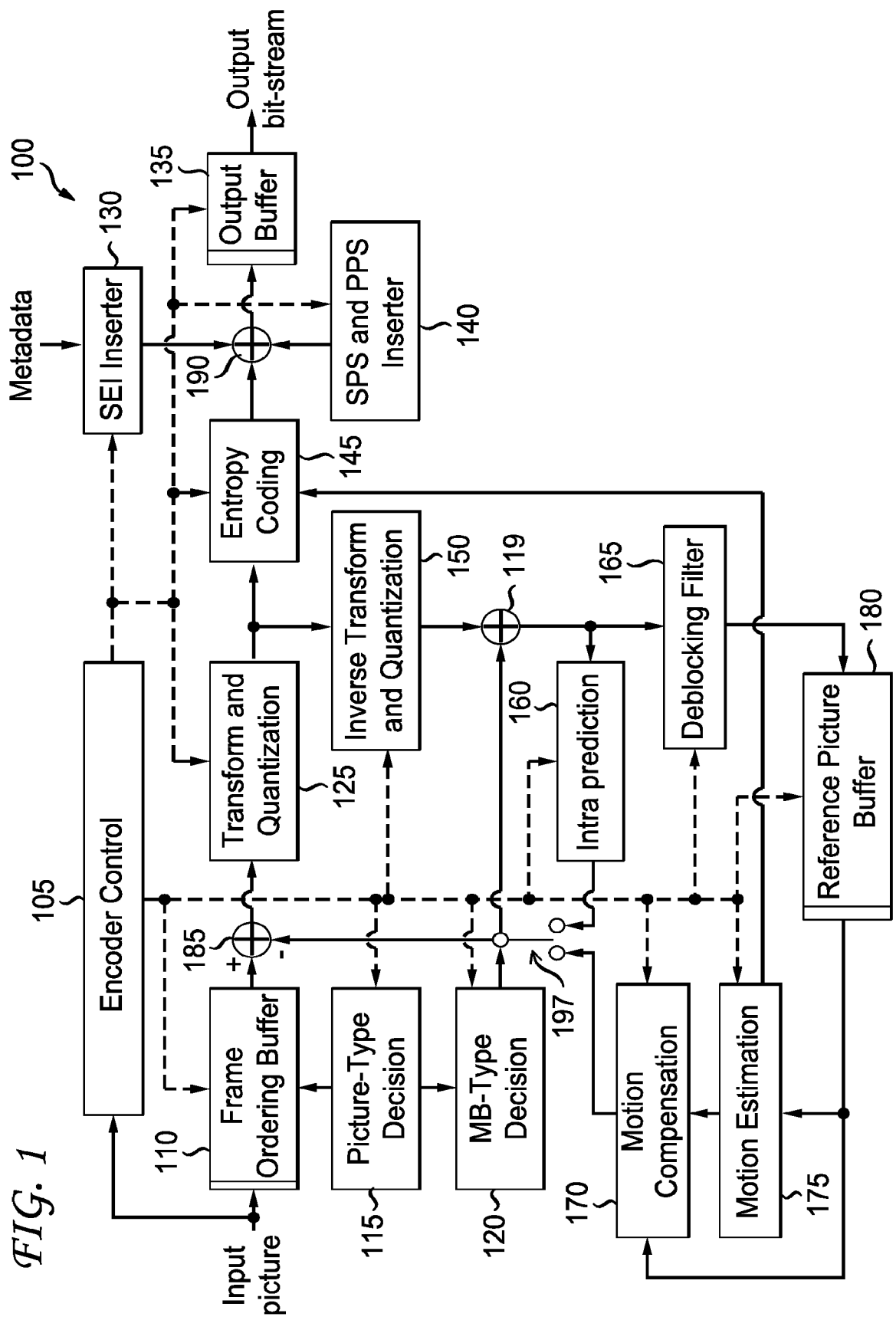
FIG. 1 is a block diagram showing an exemplary video encoder to which the present principles may be applied, in accordance with an embodiment of the present principles.

The present principles are directed to methods and apparatus for adaptive motion vector candidate ordering for video encoding and decoding.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Also, as used herein, the words "picture" and "image" are used interchangeably and refer to a still image or a picture from a video sequence. As is known, a picture may be a frame or a field.

Additionally, as used herein, the phrase "motion vector competition" refers to the adaptive selection of the order of motion vector candidates to be used as predictors. Such motion vector competition can be performed at the encoder side and/or the decoder side. According to the present principles, it is to be appreciated that the order of the motion vector candidates is adaptable responsive to some common characteristics available at both the encoder and decoder. Exemplary characteristics will be disclosed and described later herein.

Moreover, as used herein, the phrase "consistency of the motion vectors" refers to the similarity between the motion vectors. Such similarity can be judged, for example, responsive to one or more criterion as specified herein as well as readily contemplated by one of skill in this and related arts, given the teachings of the present principles provided herein.

Further, as used herein, the phrase "block prediction type" refers to a prediction type used to classify one or more blocks under consideration for the purposes of the present principles. Also, as used herein, the phrase "block partition type" refers to a partition type used to classify one or more blocks under consideration for the purposes of the present principles. Additionally, as used herein, the phrase "block location" refers to a location of one or more blocks under consideration for the purposes of the present principles. For example, the blocks may pertain to, e.g., one or more slices, one or more pictures, and so forth. Such blocks may be in the same slice or picture as the current block being encoded or decoded, or may be in neighboring slices or pictures.

For purposes of illustration and description, examples are described herein in the context of improvements over the MPEG-4 AVC Standard, using the MPEG-4 AVC Standard as the baseline for our description and explaining the improvements and extensions beyond the MPEG-4 AVC Standard. However, it is to be appreciated that the present principles are not limited solely to the MPEG-4 AVC Standard and/or extensions thereof. Given the teachings of the present principles provided herein, one of ordinary skill in this and related arts would readily understand that the present principles are equally applicable and would provide at least similar benefits when applied to extensions of other standards, or when applied and/or incorporated within standards not yet developed. That is, it would be readily apparent to those skilled in the art that other standards may be used as a starting point to describe the present principles and their new and novel elements as changes and advances beyond that standard or any other. It is to be further appreciated that the present principles also apply to video encoders and video decoders that do not conform to standards, but rather confirm to proprietary definitions.

Turning to FIG. 1, an exemplary video encoder to which the present principles may be applied is indicated generally by the reference numeral 100. The video encoder 100 includes a frame ordering buffer 110 having an output in signal communication with a non-inverting input of a combiner 185. An output of the combiner 185 is connected in signal communication with a first input of a transformer and quantizer 125. An output of the transformer and quantizer 125 is connected in signal communication with a first input of an entropy coder 145 and a first input of an inverse transformer and inverse quantizer 150. An output of the entropy coder 145 is connected in signal communication with a first non-inverting input of a combiner 190. An output of the combiner 190 is connected in signal communication with a first input of an output buffer 135.

A first output of an encoder controller 105 is connected in signal communication with a second input of the frame ordering buffer 110, a second input of the inverse transformer and inverse quantizer 150, an input of a picture-type decision module 115, a first input of a macroblock-type (MB-type) decision module 120, a second input of an intra prediction module 160, a second input of a deblocking filter 165, a first input of a motion compensator 170, a first input of a motion estimator 175, and a second input of a reference picture buffer 180.

A second output of the encoder controller 105 is connected in signal communication with a first input of a Supplemental Enhancement Information (SEI) inserter 130, a second input of the transformer and quantizer 125, a second input of the entropy coder 145, a second input of the output buffer 135, and an input of the Sequence Parameter Set (SPS) and Picture Parameter Set (PPS) inserter 140.

An output of the SEI inserter 130 is connected in signal communication with a second non-inverting input of the combiner 190.

A first output of the picture-type decision module 115 is connected in signal communication with a third input of the frame ordering buffer 110. A second output of the picture-type decision module 115 is connected in signal communication with a second input of a macroblock-type decision module 120.

An output of the Sequence Parameter Set (SPS) and Picture Parameter Set (PPS) inserter 140 is connected in signal communication with a third non-inverting input of the combiner 190.

An output of the inverse quantizer and inverse transformer 150 is connected in signal communication with a first non-inverting input of a combiner 119. An output of the combiner 119 is connected in signal communication with a first input of the intra prediction module 160 and a first input of the deblocking filter 165. An output of the deblocking filter 165 is connected in signal communication with a first input of a reference picture buffer 180. An output of the reference picture buffer 180 is connected in signal communication with a second input of the motion estimator 175 and a third input of the motion compensator 170. A first output of the motion estimator 175 is connected in signal communication with a second input of the motion compensator 170. A second output of the motion estimator 175 is connected in signal communication with a third input of the entropy coder 145.

An output of the motion compensator 170 is connected in signal communication with a first input of a switch 197. An output of the intra prediction module 160 is connected in signal communication with a second input of the switch 197. An output of the macroblock-type decision module 120 is connected in signal communication with a third input of the switch 197. The third input of the switch 197 determines whether or not the "data" input of the switch (as compared to the control input, i.e., the third input) is to be provided by the motion compensator 170 or the intra prediction module 160. The output of the switch 197 is connected in signal communication with a second non-inverting input of the combiner 119 and an inverting input of the combiner 185.

A first input of the frame ordering buffer 110 and an input of the encoder controller 105 are available as inputs of the encoder 100, for receiving an input picture. Moreover, a second input of the Supplemental Enhancement Information (SEI) inserter 130 is available as an input of the encoder 100, for receiving metadata. An output of the output buffer 135 is available as an output of the encoder 100, for outputting a bitstream.

Figure 2:
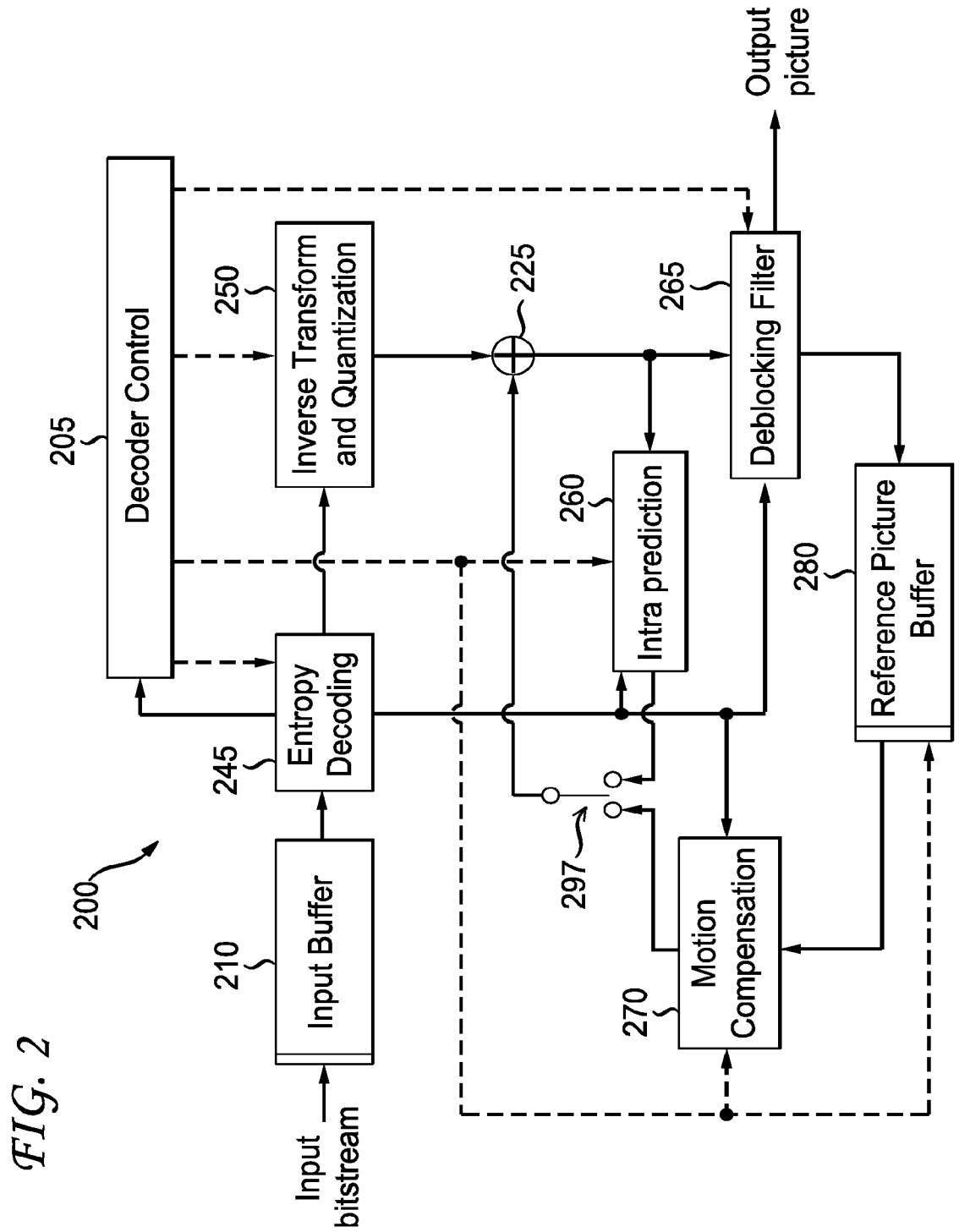
FIG. 2 is a block diagram showing an exemplary video decoder to which the present principles may be applied, in accordance with an embodiment of the present principles.

Turning to FIG. 2, an exemplary video decoder to which the present principles may be applied is indicated generally by the reference numeral 200. The video decoder 200 includes an input buffer 210 having an output connected in signal communication with a first input of an entropy decoder 245. A first output of the entropy decoder 245 is connected in signal communication with a first input of an inverse transformer and inverse quantizer 250. An output of the inverse transformer and inverse quantizer 250 is connected in signal communication with a second non-inverting input of a combiner 225. An output of the combiner 225 is connected in signal communication with a second input of a deblocking filter 265 and a first input of an intra prediction module 260. A second output of the deblocking filter 265 is connected in signal communication with a first input of a reference picture buffer 280. An output of the reference picture buffer 280 is connected in signal communication with a second input of a motion compensator 270.

A second output of the entropy decoder 245 is connected in signal communication with a third input of the motion compensator 270, a first input of the deblocking filter 265, and a third input of the intra predictor 260. A third output of the entropy decoder 245 is connected in signal communication with an input of a decoder controller 205. A first output of the decoder controller 205 is connected in signal communication with a second input of the entropy decoder 245. A second output of the decoder controller 205 is connected in signal communication with a second input of the inverse transformer and inverse quantizer 250. A third output of the decoder controller 205 is connected in signal communication with a third input of the deblocking filter 265. A fourth output of the decoder controller 205 is connected in signal communication with a second input of the intra prediction module 260, a first input of the motion compensator 270, and a second input of the reference picture buffer 280.

An output of the motion compensator 270 is connected in signal communication with a first input of a switch 297. An output of the intra prediction module 260 is connected in signal communication with a second input of the switch 297. An output of the switch 297 is connected in signal communication with a first non-inverting input of the combiner 225.

An input of the input buffer 210 is available as an input of the decoder 200, for receiving an input bitstream. A first output of the deblocking filter 265 is available as an output of the decoder 200, for outputting an output picture.

As noted above, the present principles are directed to methods and apparatus for adaptive motion vector candidate ordering for video encoding and decoding. In a second prior art approach, the order of motion vector predictor candidates is adjusted based on the current prediction mode to place the most probable motion predictor in the first position. We have noticed that the method described in the second prior art approach utilizes only very limited information, i.e., the prediction mode of the current block. The prediction mode refers to the manner in which a block is partitioned. We have recognized the limitations inherent in the second prior art approach, namely, limiting the ordering based on the manner in which a block is partitioned. Advantageously and in accordance with the present principles, we have developed methods and apparatus for using more readily available information to determine the order of motion vector candidates such that the motion vector predictor that is more frequently selected tends to have a smaller index and, thus, the overhead bits for the motion vector predictor index can be reduced.

Thus, in accordance with the present principles, we provide an adaptive motion vector competition scheme (that is, a motion vector ordering scheme), where the order of motion vector predictor candidates is adaptively determined based on some common information available at both the encoder and the decoder. In one or more embodiments, the common information includes, but is not limited to, one or more of the following: the selection frequency of the motion vector predictor candidates in the already encoded blocks; the block type of the current block; the consistency of the motion vector predictor candidates; the fidelity of the motion vector predictor candidates; the reference index of the motion vector predictor candidates; and the predictor index of the first motion vector component.

In an embodiment utilizing adaptive ordering, smaller indices are assigned to the motion vector predictors that tend to be more frequently selected and, thus, the overhead bits for the motion vector predictor index can be reduced. That is, we provide methods and apparatus for performing adaptive motion vector competition to reduce the overhead bits of conveying the index of the selected motion vector predictor and improve the coding efficiency.

For purposes of clarity and definition, we use the term motion vector competition to mean that the encoder and decoder adaptively select the order of motion vector candidates to be used as predictors. This means that the order is adaptable depending upon some common characteristic(s) available at both the encoder and decoder. Some exemplary characteristics are described herein. The candidates in the motion vector predictor set are motion vectors of the spatially neighboring blocks (e.g., the left block, the right block, the top block, the right top block, and so forth), motion vectors of the temporally neighboring blocks (e.g., the co-located block(s) in the reference frame(s)), and the function (e.g., the median value or some other value) of some motion vector candidates. In addition, candidates may be selected and ordered that are not in spatially or temporally neighboring blocks, but rather selected and ordered by some other defining characteristic. In an embodiment, the order of these candidates in the set is determined according to some common information available at both the encoder and the decoder such that the motion vector predictor that is more frequently selected tends to have a smaller index. Therefore, the overhead bits for the motion vector predictor index can be reduced. It should be noted that the adaptive ordering of the motion vector predictor is equivalent to the adaptive index of the motion vector predictor and, thereafter, we will use these two terms interchangeably.

Embodiment 1

In Embodiment 1, we use the selection frequency of the motion vector candidates in the already encoded blocks to determine the order of the motion vector candidates. One example is as follows: before encoding a block in the current frame, the encoder collects the frequency of a motion vector predictor candidate being selected in a number of previously encoded blocks, slices, or frames. Let $MV_i$ be a motion vector candidate, and $f(MV_i)$ be the frequency at which that motion vector candidate is selected. For encoding the current block, we arrange the motion vector candidates in a descending order of the selection frequency $f(MV_i)$, i.e., a motion vector candidate with a higher frequency has a smaller index. The same procedure is applied at the decoder with information available at the decoder and therefore the same determination is made at the decoder implicitly, thereby reducing the required bit overhead.

Figure 3:
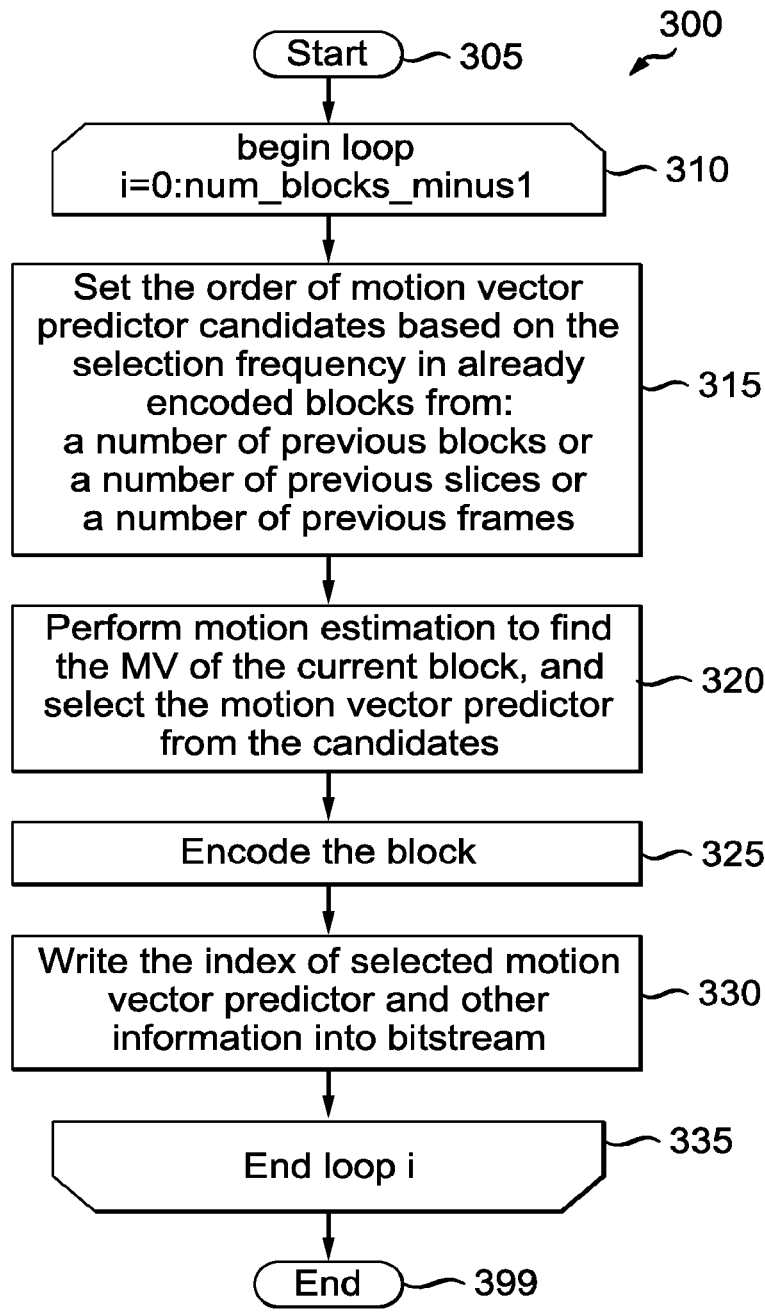
FIG. 3 is a flow diagram showing an exemplary method for adaptive motion vector candidate ordering at a video encoder, in accordance with an embodiment of the present principles.

Turning to FIG. 3, an exemplary method for adaptive motion vector candidate ordering at a video encoder is indicated generally by the reference numeral 300. The method 300 corresponds to Embodiment 1. The method 300 includes a start block 305 that passes control to a loop limit block 310. The loop limit block 310 begins a loop using a variable i having a range from 0 to the num_blocks_minus1, and passes control to a function block 315. The function block 315 sets the order of the motion vector predictor candidates based on the selection frequency in already encoded blocks from a number of previous blocks or a number of previous slices or a number of previous frames, and passes control to a function block 320. The function block 320 performs motion estimation to find the motion vector of the current block, selects the motion vector predictor from the candidates, and passes control to a function block 325. The function block 325 encodes the block, and passes control to a function block 330. The function block 330 writes the index of the selected motion vector predictor and other information into a bitstream, and passes control to a loop limit block 335. The loop limit block 335 ends the loop, and passes control to an end block 399.

Figure 4:
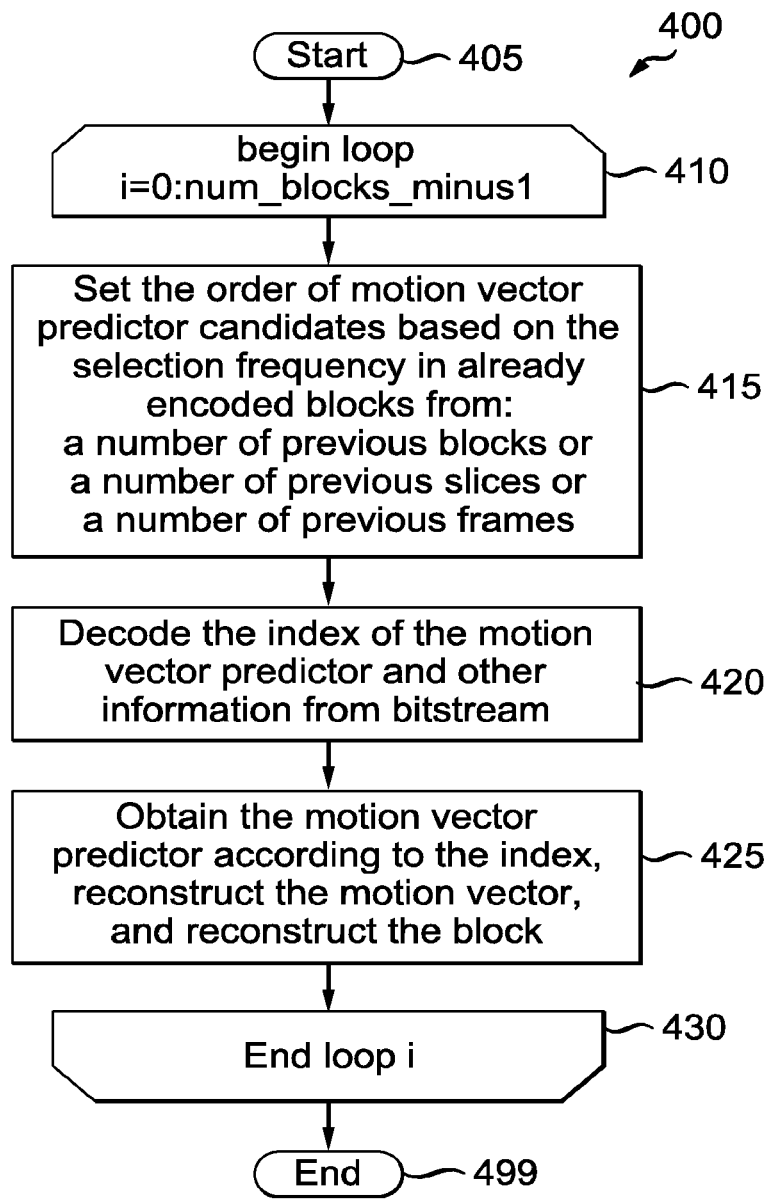
FIG. 4 is a flow diagram showing an exemplary method for adaptive motion vector candidate ordering at a video decoder, in accordance with an embodiment of the present principles.

Turning to FIG. 4, an exemplary method for adaptive motion vector candidate ordering at a video decoder is indicated generally by the reference numeral 400. The method 400 corresponds to Embodiment 1. The method 400 includes a start block 405 that passes control to a loop limit block 410. The loop limit block 410 begins a loop using a variable i having a range from 0 to the num_blocks_minus1, and passes control to a function block 415. The function block 415 sets the order of the motion vector predictor candidates based on the selection frequency in already encoded blocks from a number of previous blocks or a number of previous slices or a number of previous frames, and passes control to a function block 420. The function block 420 decodes the index of the motion vector predictor and other information from the bitstream, and passes control to a function block 425. The function block 425 obtains the motion vector predictor according to the index, reconstructs the motion vector, reconstructs the block, and passes control to a loop limit block 430. The loop limit block 430 ends the loop, and passes control to an end block 499.

Embodiment 2

In Embodiment 2, we first classify blocks into different categories. The classification criterion can be the prediction type of a block (e.g., predictive (P) or bi-predictive (B) type prediction), the partition type of a block (e.g., partition size), the location of a block relative to available predictors (e.g., the nearest available predictor block is often the best candidate, but is not always so), and so forth. We collect the selection frequency of the motion vector candidates for the already encoded blocks in each category. Let $MV_i$ be a motion vector candidate, and $f(MV_i, C_j)$ be the selection frequency of that motion vector candidate for category $C_j$ blocks in a number of the previously encoded blocks, slices or frames. Presuming that the current block belonging to category $C_C$, we adjust the motion vector candidate index according to $f(MV_i, C_j)$. Specifically, a motion vector candidate $MV_k$ with a higher frequency $f(MV_k, C_j)$ has a smaller index. The same procedure is applied at the decoder with information available at the decoder and, therefore, the same determination is made at the decoder implicitly, thereby reducing the required bit overhead.

Figure 5:
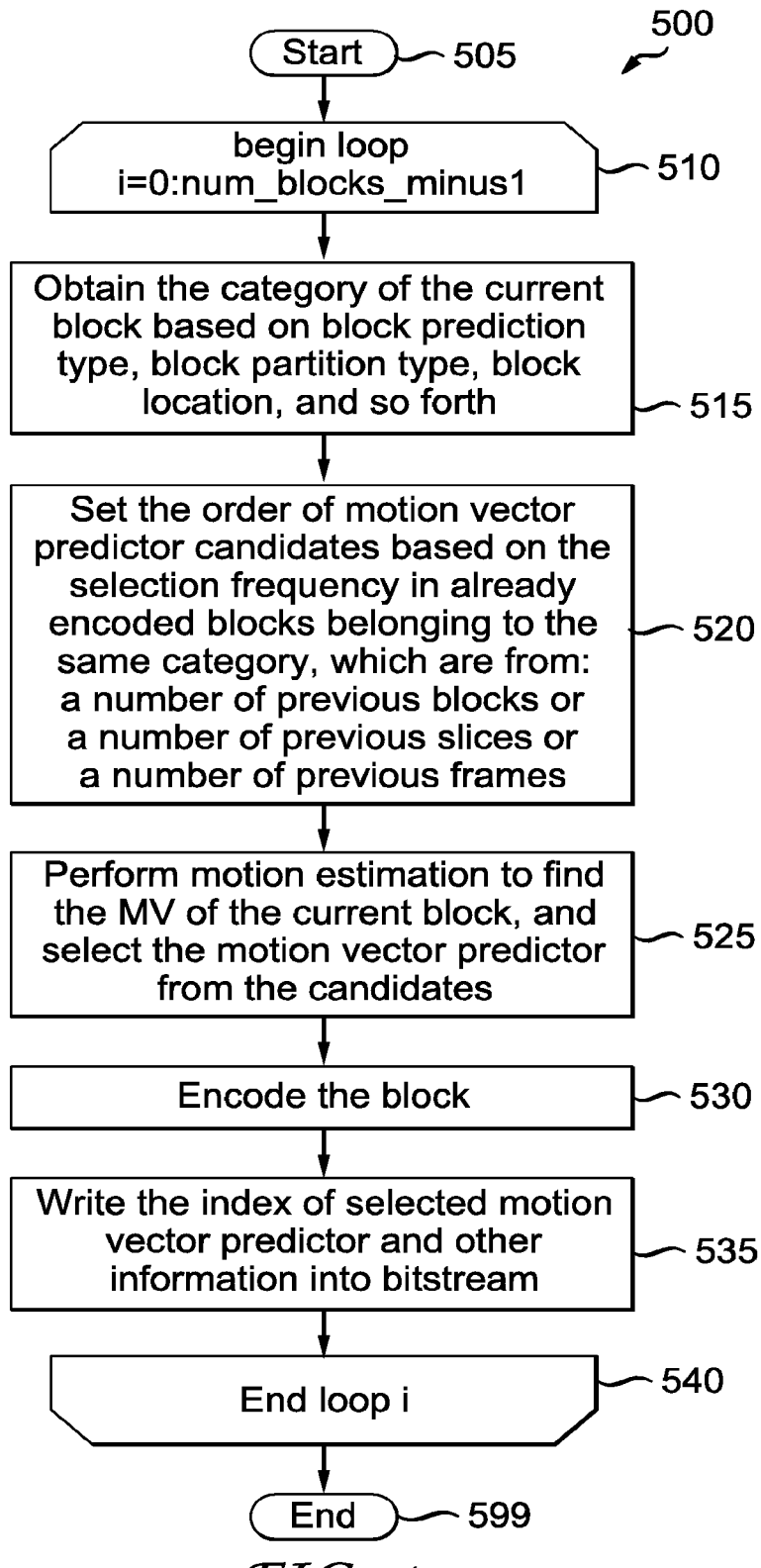
FIG. 5 is a flow diagram showing an exemplary method for adaptive motion vector candidate ordering at a video encoder, in accordance with an embodiment of the present principles.

Turning to FIG. 5, an exemplary method for adaptive motion vector candidate ordering at a video encoder is indicated generally by the reference numeral 500. The method 500 corresponds to Embodiment 2. The method 500 includes a start block 505 that passes control to a loop limit block 510. The loop limit block 510 begins a loop using a variable i having a range from 0 to the num_blocks_minus1, and passes control to a function block 515. The function block 515 obtains the category of the current block based on block prediction type, block partition type, block location, and so forth, and passes control to a function block 520. The function block 520 sets the order of the motion vector predictor candidates based on the selection frequency in already encoded blocks belonging to the same category, which are from a number of previous blocks or a number of previous slices or a number of previous frames, and passes control to a function block 525. The function block 525 performs motion estimation to find the motion vector of the current block, selects the motion vector predictor from the candidates, and passes control to a function block 530. The function block 530 encodes the block, and passes control to a function block 535. The function block 535 writes the index of the selected motion vector predictor and other information into a bitstream, and passes control to a loop limit block 540. The loop limit block 540 ends the loop, and passes control to an end block 599.

Figure 6:
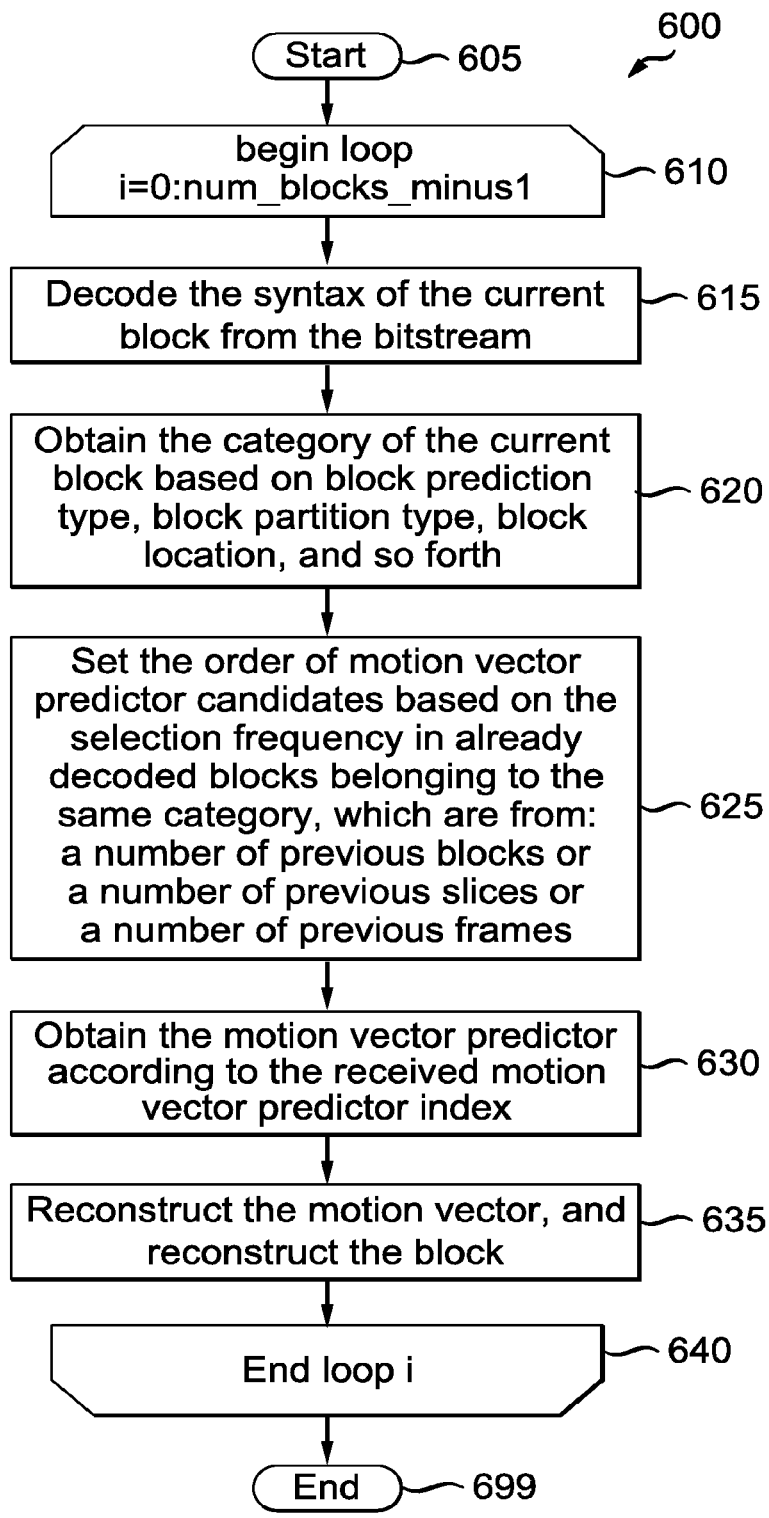
FIG. 6 is a flow diagram showing an exemplary method for adaptive motion vector candidate ordering at a video decoder, in accordance with an embodiment of the present principles.

Turning to FIG. 6, an exemplary method for adaptive motion vector candidate ordering at a video decoder is indicated generally by the reference numeral 600. The method 600 corresponds to Embodiment 2. The method 600 includes a start block 605 that passes control to a loop limit block 610. The loop limit block 610 begins a loop using a variable i having a range from 0 to the num_blocks_minus1, and passes control to a function block 615. The function block 615 decodes the syntax of the current block from the bitstream, and passes control to a function block 620. The function block 620 obtains the category of the current block based on block prediction type, block partition type, block location, and so forth, and passes control to a function block 625. The function block 625 sets the order of the motion vector predictor candidates based on the selection frequency in already decoded blocks from a number of previous blocks or a number of previous slices or a number of previous frames, and passes control to a function block 630. The function block 630 obtains the motion vector predictor according to the received motion vector predictor index, and passes control to a function block 635. The function block 635 reconstructs the motion vector, reconstructs the block, and passes control to a loop limit block 640. The loop limit block 640 ends the loop, and passes control to an end block 699.

Embodiment 3

In Embodiment 3, we first classify the motion vector candidates of the current block into different categories based on the consistency of the motion vectors. As noted above, the consistency of the motion vectors refers to the similarity between the motion vectors. An example method of grouping motion vectors based on their consistency (similarity) is as follows: Let $C_i$ be a group, for any two motion vectors, e.g., $MV_a=(MVX_a, MVY_a)$ and $MV_b=(MVX_b, MVY_b)$ belonging two this group, their difference is smaller than a threshold T, i.e., $|MVX_a-MVX_b|+|MVY_a-MVY_b|<T$. Suppose we have N categories, $C_0, C_1, \ldots C_{N-1}$. We assign the index of motion vector predictor in an interleaving manner. An example is as follows: index 0 to index N−1 are given to the first elements in $C_0$ to $C_{N-1}$ respectively; index N to index 2N−1 are given to the second elements in $C_0$ to $C_{N-1}$ respectively; and so forth. The same procedure is applied at the decoder with information available at the decoder and therefore the same determination is made at the decoder implicitly, thereby reducing the required bit overhead.

Figure 7:
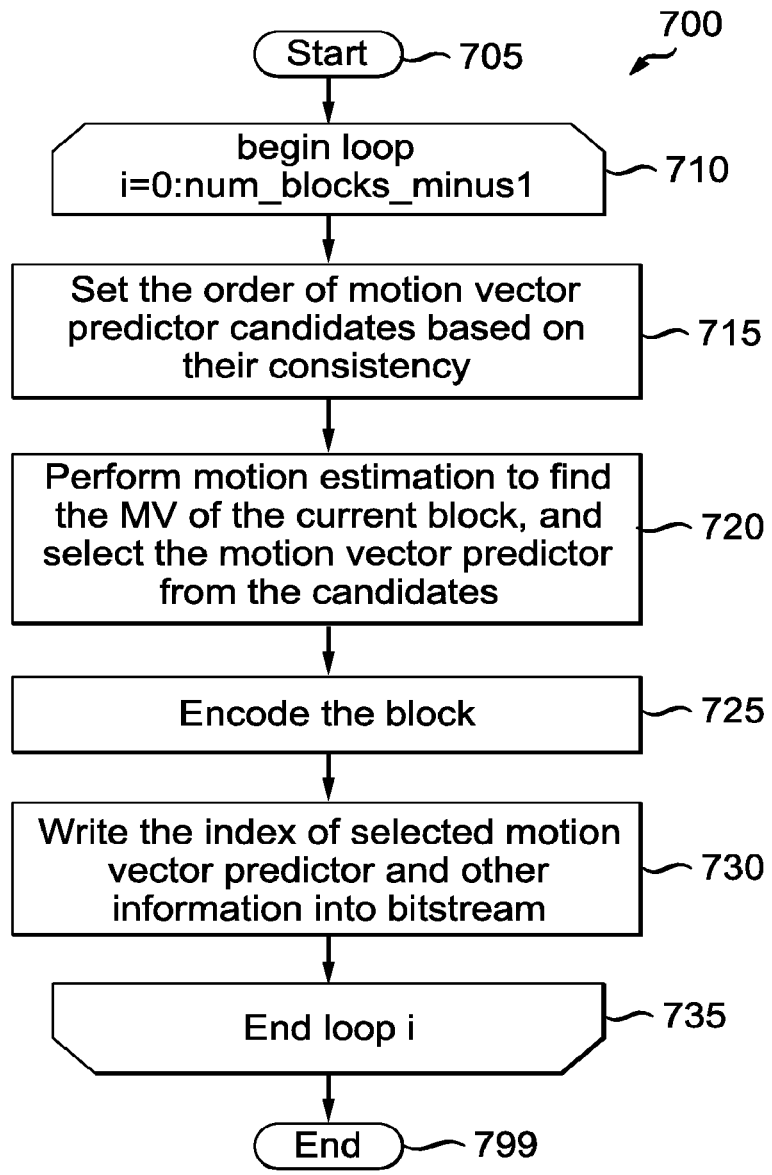
FIG. 7 is a flow diagram showing an exemplary method for adaptive motion vector candidate ordering at a video encoder, in accordance with an embodiment of the present principles.

Turning to FIG. 7, an exemplary method for adaptive motion vector candidate ordering at a video encoder is indicated generally by the reference numeral 700. The method 700 corresponds to Embodiment 3. The method 700 includes a start block 705 that passes control to a loop limit block 710. The loop limit block 710 begins a loop using a variable i having a range from 0 to the num_blocks_minus1, and passes control to a function block 715. The function block 715 sets the order of the motion vector predictor candidates based on their consistency, and passes control to a function block 720. The function block 720 performs motion estimation to find the motion vector of the current block, selects the motion vector predictor from the candidates, and passes control to a function block 725. The function block 725 encodes the block, and passes control to a function block 730. The function block 730 writes the index of the selected motion vector predictor and other information into a bitstream, and passes control to a loop limit block 735. The loop limit block 735 ends the loop, and passes control to an end block 799.

Figure 8:
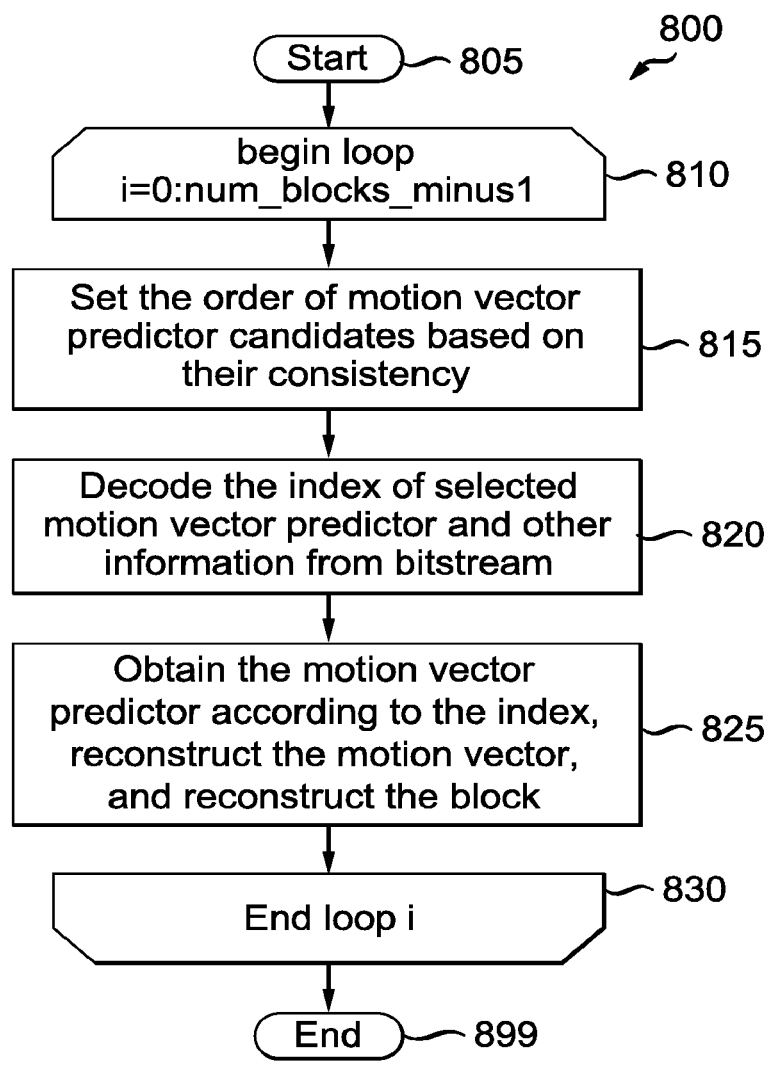
FIG. 8 is a flow diagram showing an exemplary method for adaptive motion vector candidate ordering at a video decoder, in accordance with an embodiment of the present principles.

Turning to FIG. 8, an exemplary method for adaptive motion vector candidate ordering at a video decoder is indicated generally by the reference numeral 800. The method 800 corresponds to Embodiment 3. The method 800 includes a start block 805 that passes control to a loop limit block 810. The loop limit block 810 begins a loop using a variable i having a range from 0 to the num_blocks_minus1, and passes control to a function block 815. The function block 815 sets the order of the motion vector predictor candidates based on their consistency, and passes control to a function block 820. The function block 820 decodes the index of the motion vector predictor and other information from the bitstream, and passes control to a function block 825. The function block 825 obtains the motion vector predictor according to the index, reconstructs the motion vector, reconstructs the block, and passes control to a loop limit block 830. The loop limit block 830 ends the loop, and passes control to an end block 899.

Embodiment 4

In Embodiment 4, we calculate a fidelity value for each motion vector candidate of the current block. The fidelity value reflects the accuracy of the motion vector. One example of calculating the fidelity value is as follows: Let candidate $MV_i$ be the MV from block $Blk_i$. The fidelity value of $MV_i$, $F(MV_i)$ is the function of the reconstructed residue $E_i$ of block $Blk_i$, calculated as follows:

$$F(MV_i)=f(E_i).$$

The function should be a decreasing function of residue $E_i$, which means a larger residue results in a lower fidelity. We arrange the motion vector candidates in descending order of the fidelity value, i.e., a motion vector candidate with a higher fidelity value $F(MV_i)$ has a smaller index. The same procedure is applied at the decoder with information available at the decoder and therefore the same determination is made at the decoder implicitly, thereby reducing the required bit overhead.

Figure 9:
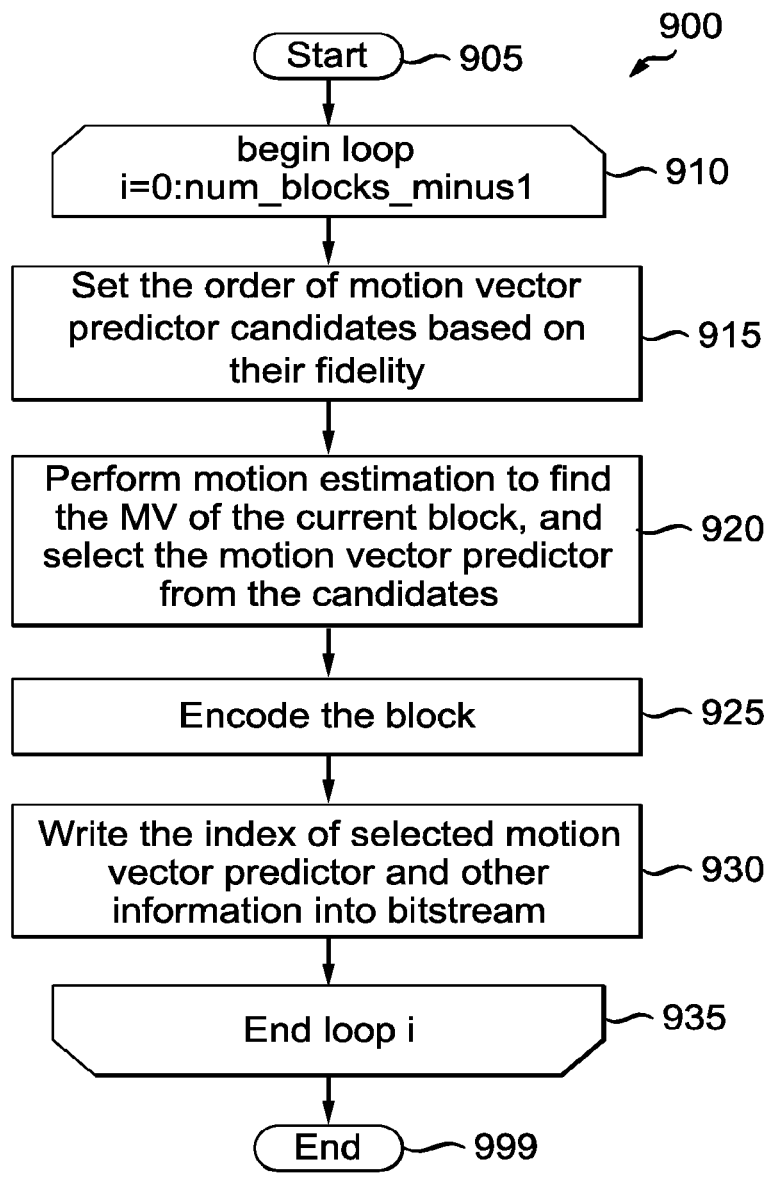
FIG. 9 is a flow diagram showing an exemplary method for adaptive motion vector candidate ordering at a video encoder, in accordance with an embodiment of the present principles.

Turning to FIG. 9, an exemplary method for adaptive motion vector candidate ordering at a video encoder is indicated generally by the reference numeral 900. The method 900 corresponds to Embodiment 4. The method 900 includes a start block 905 that passes control to a loop limit block 910. The loop limit block 910 begins a loop using a variable i having a range from 0 to the num_blocks_minus1, and passes control to a function block 915. The function block 915 sets the order of the motion vector predictor candidates based on their fidelity, and passes control to a function block 920. The function block 920 performs motion estimation to find the motion vector of the current block, selects the motion vector predictor from the candidates, and passes control to a function block 925. The function block 925 encodes the block, and passes control to a function block 930. The function block 930 writes the index of the selected motion vector predictor and other information into a bitstream, and passes control to a loop limit block 935. The loop limit block 935 ends the loop, and passes control to an end block 999.

Figure 10:
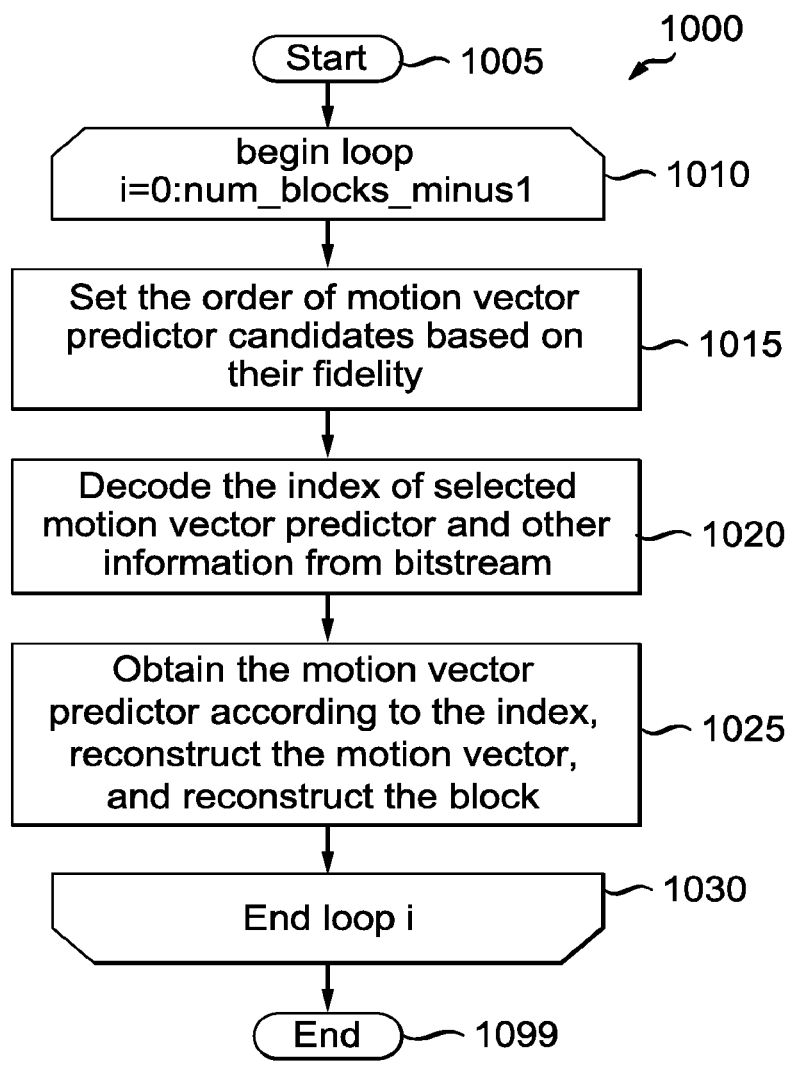
FIG. 10 is a flow diagram showing an exemplary method for adaptive motion vector candidate ordering at a video decoder, in accordance with an embodiment of the present principles.

Turning to FIG. 10, an exemplary method for adaptive motion vector candidate ordering at a video decoder is indicated generally by the reference numeral 1000. The method 1000 corresponds to Embodiment 4. The method 1000 includes a start block 1005 that passes control to a loop limit block 1010. The loop limit block 1010 begins a loop using a variable i having a range from 0 to the num_blocks_minus1, and passes control to a function block 1015. The function block 1015 sets the order of the motion vector predictor candidates based on their fidelity, and passes control to a function block 1020. The function block 1020 decodes the index of the motion vector predictor and other information from the bitstream, and passes control to a function block 1025. The function block 1025 obtains the motion vector predictor according to the index, reconstructs the motion vector, reconstructs the block, and passes control to a loop limit block 1030. The loop limit block 1030 ends the loop, and passes control to an end block 1099.

Embodiment 5

Motion vector candidates are motion vectors of the spatially or temporal neighboring blocks, and each of them is associated with a reference frame index. In Embodiment 5, we arrange the order of the motion vector candidates based on the reference frame index. One example is as follows: suppose $r_c$ is the reference frame index of the current block. For a motion vector predictor candidate $MV_i$ with reference frame index we calculate its reference frame difference with respect to the current block, $d_i=abs(r_i-r_c)$, and arrange the motion vector candidate in a descending order of the reference frame index difference $d_i$. The same procedure is applied at the decoder with information available at the decoder and therefore the same determination is made at the decoder implicitly, thereby reducing the required bit overhead.

Figure 11:
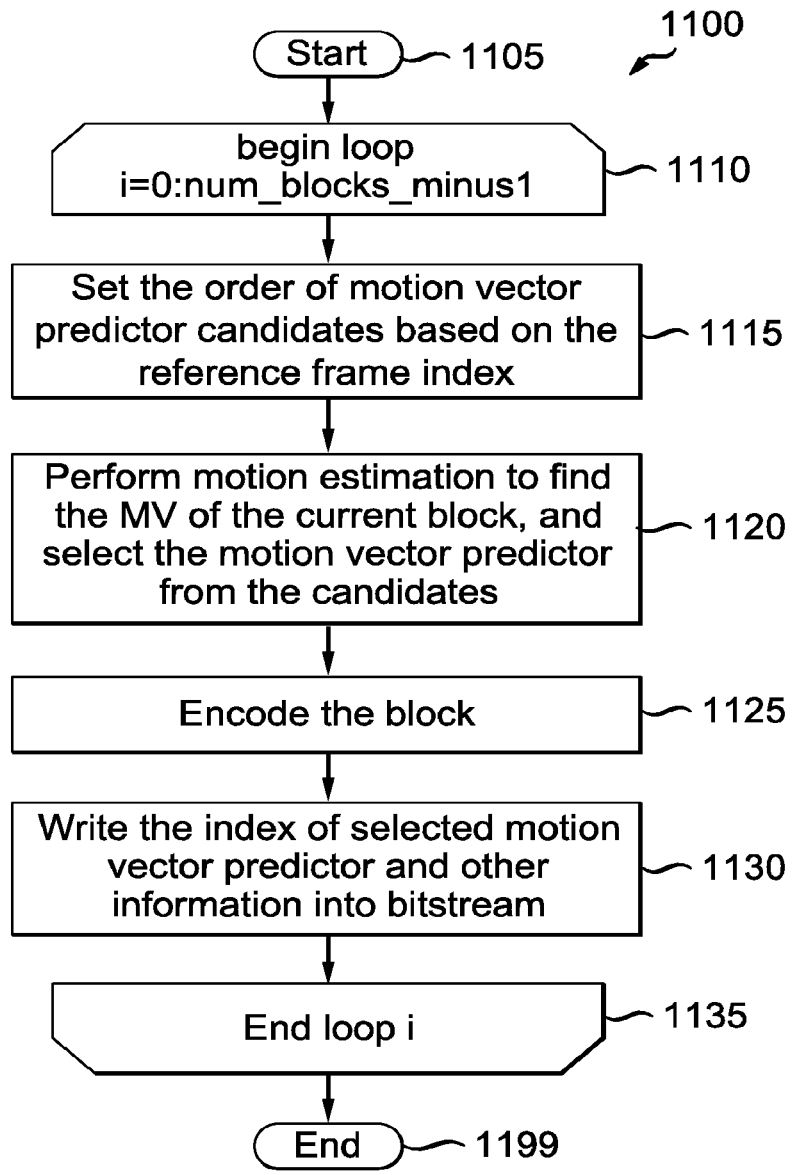
FIG. 11 is a flow diagram showing an exemplary method for adaptive motion vector candidate ordering at a video encoder, in accordance with an embodiment of the present principles.

Turning to FIG. 11, an exemplary method for adaptive motion vector candidate ordering at a video encoder is indicated generally by the reference numeral 1100. The method 1100 corresponds to Embodiment 5. The method 1100 includes a start block 1105 that passes control to a loop limit block 1110. The loop limit block 1110 begins a loop using a variable i having a range from 0 to the num_blocks_minus1, and passes control to a function block 1115. The function block 1115 sets the order of the motion vector predictor candidates based on the reference frame index, and passes control to a function block 1120. The function block 1120 performs motion estimation to find the motion vector of the current block, selects the motion vector predictor from the candidates, and passes control to a function block 1125. The function block 1125 encodes the block, and passes control to a function block 1130. The function block 1130 writes the index of the selected motion vector predictor and other information into a bitstream, and passes control to a loop limit block 1135. The loop limit block 1135 ends the loop, and passes control to an end block 1199.

Figure 12:
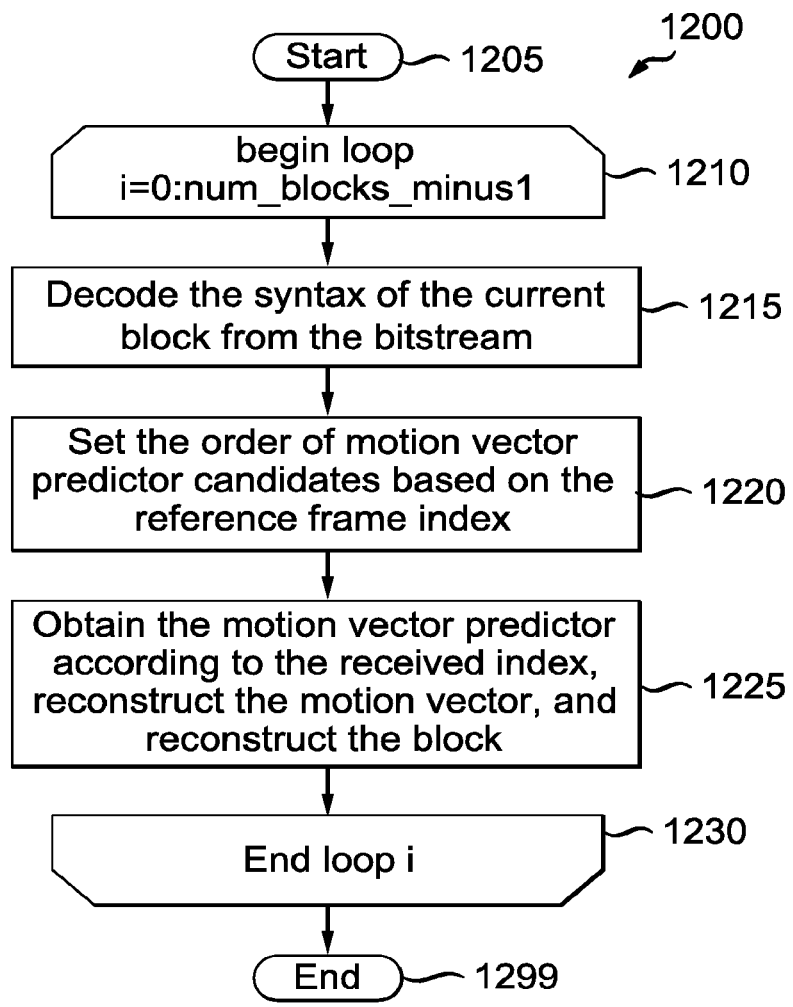
FIG. 12 is a flow diagram showing an exemplary method for adaptive motion vector candidate ordering at a video decoder, in accordance with an embodiment of the present principles.

Turning to FIG. 12, an exemplary method for adaptive motion vector candidate ordering at a video decoder is indicated generally by the reference numeral 1200. The method 1200 corresponds to Embodiment 5. The method 1200 includes a start block 1205 that passes control to a loop limit block 1210. The loop limit block 1210 begins a loop using a variable i having a range from 0 to the num_blocks_minus1, and passes control to a function block 1215. The function block 1215 decodes the syntax of the current block from the bitstream, and passes control to a function block 1220. The function block 1220 sets the order of the motion vector predictor candidates based on the reference frame index, and passes control to a function block 1225. The function block 1225 obtains the motion vector predictor according to the received index, reconstructs the motion vector, reconstructs the block, and passes control to a loop limit block 1230. The loop limit block 1230 ends the loop, and passes control to an end block 1299.

Embodiment 6

Motion vector candidate selection (MVComp) can be applied to each component of a motion vector. Using the motion vector horizontal component mv_x as an example, such component can have multiple predictor candidates, which are the horizontal components of the motion vector of the spatially and temporally neighboring blocks, and an index idx_x is transmitted to signal which predictor is used. Similarly, the vertical component mv_y also can have multiple predictor candidates, and an index idx_y is transmitted. Suppose idx_x is transmitted before transmitting mv_y. The order of predictor candidates for mv_y can be adjusted based on the value of idx_x. One example is as follows: suppose candidate $mv\_x_i$ belonging to $mv_i$ is selected as the predictor of my x, and its index is $idx\_x_i$. Let $mv\_y_j$ belonging to $mv_j$ be a candidate of mv_y. We calculate the difference between $mv_j$ and $mv_i$. For example, an $mv\_y_i$ with a larger difference will have a larger index. At the decoder side, the decoder obtains $mv\_x_i$ based on the received $idx\_x_i$. The same procedure is applied at the decoder with information available at the decoder and therefore the same determination is made at the decoder implicitly, thereby reducing the required bit overhead.

Figure 13:
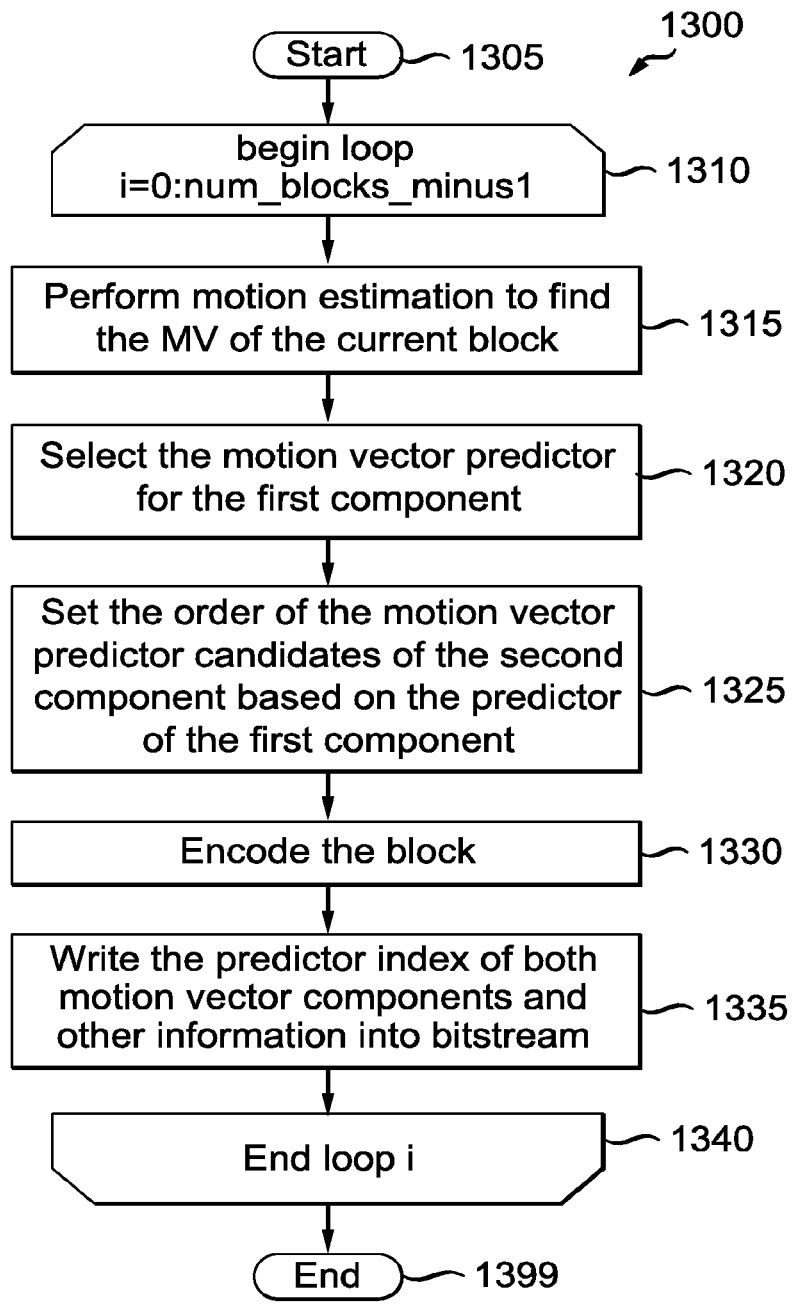
FIG. 13 is a flow diagram showing an exemplary method for adaptive motion vector candidate ordering at a video encoder, in accordance with an embodiment of the present principles.

Turning to FIG. 13, an exemplary method for adaptive motion vector candidate ordering at a video encoder is indicated generally by the reference numeral 1300. The method 1300 corresponds to Embodiment 6. The method 1300 includes a start block 1305 that passes control to a loop limit block 1310. The loop limit block 1310 begins a loop using a variable i having a range from 0 to the num_blocks_minus1, and passes control to a function block 1315. The function block 1315 performs motion estimation to find the motion vector (MV) of the current block, and passes control to a function block 1320. The function block 1320 selects the motion vector predictor for the first component, and passes control to the function block 1325. The function block 1325 sets the order of the motion vector predictor candidates of the second component based on the predictor of the first component, and passes control to the function block 1330. The function block 1330 encodes the block, and passes control to the function block 1335. The function block 1335 writes the predictor index of both motion vector components and other information into a bitstream, and passes control to a loop limit block 1340. The loop limit block 1340 ends the loop, and passes control to an end block 1399.

Figure 14:
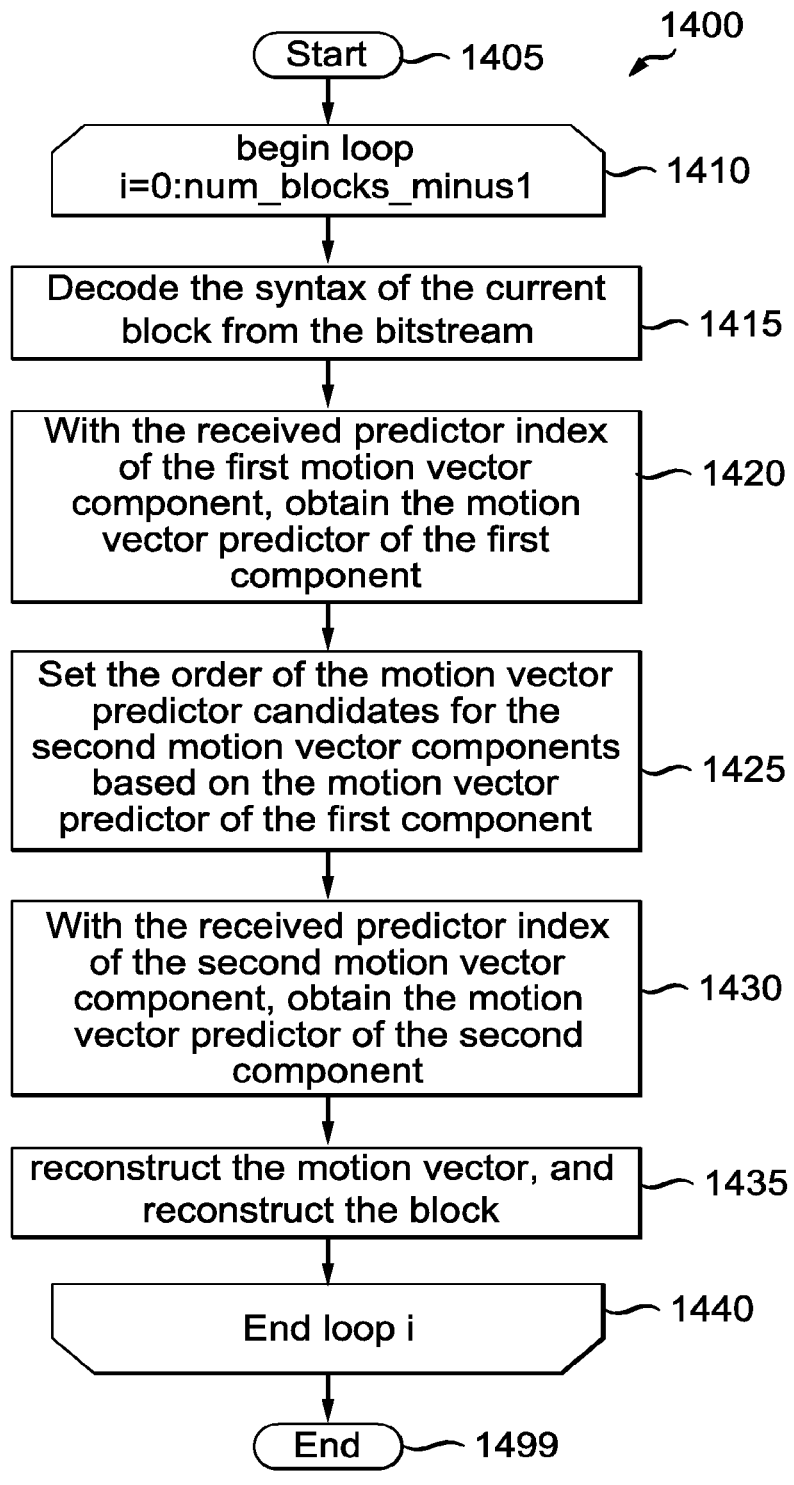
FIG. 14 is a flow diagram showing an exemplary method for adaptive motion vector candidate ordering at a video decoder, in accordance with an embodiment of the present principles.

Turning to FIG. 14, an exemplary method for adaptive motion vector candidate ordering at a video decoder is indicated generally by the reference numeral 1400. The method 1400 corresponds to Embodiment 6. The method 1400 includes a start block 1405 that passes control to a loop limit block 1410. The loop limit block 1410 begins a loop using a variable i having a range from 0 to the num_blocks_minus1, and passes control to a function block 1415. The function block 1415 decodes the syntax of the current block from the bitstream, and passes control to a function block 1420. The function block 1420, with the received predictor index of the first motion vector component, obtains the motion vector predictor of the first component, and passes control to a function block 1425. The function block 1425 sets the order of the motion vector predictor candidates for the second motion vector components based on the motion vector predictor of the first component, and passes control to a function block 1430. The function block 1430, with the received predictor index of the second motion vector component, obtains the motion vector predictor of the second component, and passes control to a function block 1435. The function block 1435 reconstructs the motion vector, reconstructs the block, and passes control to a loop limit block 1440. The loop limit block 1440 ends the loop, and passes control to an end block 1499.

Syntax

TABLE 1 shows exemplary slice header syntax, in accordance with an embodiment of the present principles.

TABLE 1

|  | Descriptor |
|---|---|
| slice_header( ) { | |
| ... | |
| adaptive_mvp_ordering_flag | u(1) |
| ... | |
| if (adaptive_mvp_ordering_flag) | |
| { | |
| adaptive_mvp_ordering_mode | u(v) |
| } | |
| ... | |
| } | |

The semantics of the syntax elements shown in TABLE 1 are as follows:

adaptive_mvp_ordering_flag specifies whether adaptive motion vector competition is used. adaptive_mvp_ordering_flag equal to 1 means adaptive ordering is used for motion vector competition. adaptive_mvp_ordering_flag equal to 0 means adaptive ordering is not used for motion vector competition adaptive_mvp_ordering_mode specifies the adaptive ordering method used for this slice. adaptive_mvp_ordering_mode=0 indicates that adaptive ordering based on the selection frequency of motion vector candidate in the already encoded blocks is used (an example method is given in Embodiment 1). adaptive_mvp_ordering_mode=1 indicates that adaptive ordering based on the selection frequency of motion vector candidate in the already encoded blocks belonging to the same category as the current block is used (an example method is given in Embodiment 2). adaptive_mvp_ordering_mode=2 indicates that adaptive ordering based on the consistency of motion vector predictor candidates is used (an example method is given in Embodiment 3). adaptive_mvp_ordering_mode=3 indicates that adaptive ordering based on the fidelity of motion vector predictor candidates is used (an example method is given in Embodiment 4). adaptive_mvp_ordering_mode=4 indicates that adaptive ordering based on the reference frame index of motion vector predictor candidates is used (an example method is given in Embodiment 5). adaptive_mvp_ordering_mode=5 indicates that each motion vector component has its own predictor index, and the predictor candidates ordering of the second component is adapted on the received predictor index of the first component (an example method is given in Embodiment 6).

A description will now be given of some of the many attendant advantages/features of the present invention, some of which have been mentioned above. For example, one advantage/feature is an apparatus having a video encoder for encoding a block in a picture by selecting an order of motion vector predictor candidates for the block responsive to a characteristic available at both the video encoder and a corresponding decoder, wherein the characteristic excludes a mode in which the block is partitioned.

Another advantage/feature is the apparatus having the video encoder as described above, wherein the characteristic includes a motion vector candidate selection frequency in a number of already encoded blocks.

Yet another advantage/feature is the apparatus having the video encoder wherein the characteristic includes a motion vector candidate selection frequency in a number of already encoded blocks as described above, wherein a category classification is performed to determine one of a plurality of categories to which the block belongs, and the motion vector candidate selection frequency is determined from the number of already encoded blocks that belong to the same one of the plurality of categories as the block.

Still another advantage/feature is the apparatus having the video encoder wherein a category classification is performed to determine one of a plurality of categories to which the block belongs, and the motion vector candidate selection frequency is determined from the number of already encoded blocks that belong to the same one of the plurality of categories as the block as described above, wherein a criterion for the category classification is a block prediction type.

Moreover, another advantage/feature is the apparatus having the video encoder wherein a category classification is performed to determine one of a plurality of categories to which the block belongs, and the motion vector candidate selection frequency is determined from the number of already encoded blocks that belong to the same one of the plurality of categories as the block as described above, wherein a criterion for the category classification is a block partition type.

Further, another advantage/feature is the apparatus having the video encoder wherein a category classification is performed to determine one of a plurality of categories to which the block belongs, and the motion vector candidate selection frequency is determined from the number of already encoded blocks that belong to the same one of the plurality of categories as the block as described above, wherein a criterion for the category classification is a block location.

Also, another advantage/feature is the apparatus having the video encoder as described above, wherein the characteristic includes a consistency of the motion vector predictor candidates.

Additionally, another advantage/feature is the apparatus having the video encoder wherein the characteristic includes a consistency of the motion vector predictor candidates as described above, wherein the consistency is a function of a difference between the motion vector predictor candidates that are available at both the video encoder and the corresponding decoder.

Moreover, another advantage/feature is the apparatus having the video encoder as described above, wherein the characteristic includes a fidelity of the motion vector predictor candidates.

Further, another advantage/feature is the apparatus having the video encoder wherein the characteristic includes a fidelity of the motion vector predictor candidates as described above, wherein the fidelity is a function of corresponding reconstructed residue coefficients which are available at both the video encoder and the corresponding decoder.

Also, another advantage/feature is the apparatus having the video encoder as described above, wherein the characteristic includes a reference frame index of the motion vector predictor candidates.

Additionally, another advantage/feature is the apparatus having the video encoder as described above, wherein the motion vector predictor candidates include a first motion vector predictor candidate for a first component of a motion vector and a second motion vector predictor candidate for a second component of the motion vector, and an order of the second motion vector predictor candidate for the second component is adapted responsive to a predictor index of the first component.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

The invention claimed is:

1. An apparatus, comprising:
a video encoder for encoding a block in a picture by selecting an order of motion vector predictor candidates for the block, based on common information available at both the video encoder and a corresponding decoder and
wherein said common information is not transmitted in an encoded bitstream,
wherein said common information comprise a reference frame index of the motion vector predictor candidates which is not derived based on partitioning of the block; and
wherein motion vector predictor candidates can be from spatial or temporal blocks and a motion vector can be determined based on a distance between a reference frame and a current frame,
and syntax is indicative of prediction mode and partition type of said block.

2. The apparatus of claim 1, wherein the common information further comprises a motion vector candidate selection frequency in a number of already encoded blocks.

3. The apparatus of claim 2, wherein a category classification is performed to determine one of a plurality of categories to which the block belongs, and the motion vector candidate selection frequency is determined from the number of already encoded blocks that belong to the same one of the plurality of categories as the block.

4. The apparatus of claim 3, wherein a criterion for the category classification is a block prediction type.

5. A method, comprising:
encoding a block in a picture by selecting an order of motion vector predictor candidates for the block, based on common information available at both an encoder and a corresponding decoder and
wherein said common information is not transmitted in an encoded bitstream,
wherein said common information comprise a reference frame index of the motion vector predictor candidates which is not derived based on partitioning of the block; and
wherein motion vector predictor candidates can be from spatial or temporal blocks and a motion vector can be determined based on a distance between a reference frame and a current frame,
and syntax is indicative of prediction mode and partition type of said block.

6. The method of claim 5, wherein the common information further comprises a motion vector candidate selection frequency in a number of already encoded blocks.

7. The method of claim 6, wherein a category classification is performed to determine one of a plurality of categories to which the block belongs, and the motion vector candidate selection frequency is determined from the number of already encoded blocks that belong to the same one of the plurality of categories as the block.

8. The method of claim 7, wherein a criterion for the category classification is a block prediction type.

9. An apparatus, comprising:
a video decoder for decoding a block in a picture by selecting an order of motion vector predictor candidates for the block, based on common information available at both an encoder and a corresponding decoder and
wherein said common information is not transmitted in an encoded bitstream,
wherein said common information comprise a reference frame index of the motion vector predictor candidates which is not derived based on partitioning of the block; and
wherein motion vector predictor candidates can be from spatial or temporal blocks and a motion vector can be determined based on a distance between a reference frame and a current frame,
and syntax is indicative of prediction mode and partition type of said block.

10. The apparatus of claim 9, wherein the common information further comprises a motion vector candidate selection frequency in a number of already encoded blocks.

11. The apparatus of claim 10, wherein a category classification is performed to determine one of a plurality of categories to which the block belongs, and the motion vector candidate selection frequency is determined from the number of already encoded blocks that belong to the same one of the plurality of categories as the block.

12. The apparatus of claim 11, wherein a criterion for the category classification is a block prediction type.

13. A method, comprising:
decoding a block in a picture by selecting an order of motion vector predictor candidates for the block, based on common information available at both an encoder and a corresponding decoder and
wherein said common information is not transmitted in an encoded bitstream,
wherein said common information comprise a reference frame index of the motion vector predictor candidates which is not derived based on partitioning of the block; and
wherein motion vector predictor candidates can be from spatial or temporal blocks and a motion vector can be determined based on a distance between a reference frame and a current frame,
and syntax is indicative of prediction mode and partition type of said block.

14. The method of claim 13, wherein the common information further comprises a motion vector candidate selection frequency in a number of already encoded blocks.

15. The method of claim 14, wherein a category classification is performed to determine one of a plurality of categories to which the block belongs, and the motion vector candidate selection frequency is determined from the number of already encoded blocks that belong to the same one of the plurality of categories as the block.

16. The method of claim 15, wherein a criterion for the category classification is a block prediction type.

17. A non-transitory computer readable storage media having instructions stored thereupon that when executed on a processor, cause the processor to perform the method of claim 13.

18. The non-transitory computer readable storage media of claim 17, wherein the common information further comprises a motion vector candidate selection frequency in a number of already encoded blocks.

19. The non-transitory computer readable storage media of claim 18, wherein a category classification is performed to determine one of a plurality of categories to which the block belongs, and the motion vector candidate selection frequency is determined from the number of already encoded blocks that belong to the same one of the plurality of categories as the block.

20. The non-transitory computer readable storage media of claim 19, wherein a criterion for the category classification is a block prediction type.

* * * * *